Patented June 10, 1924.

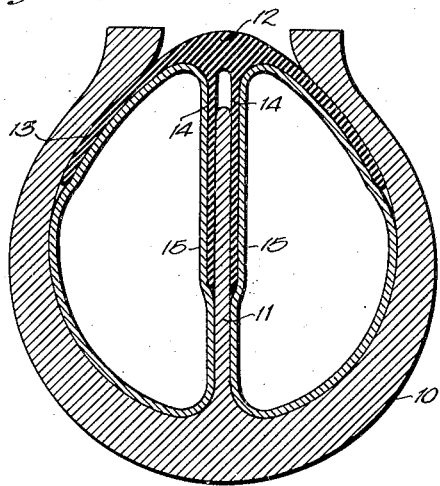
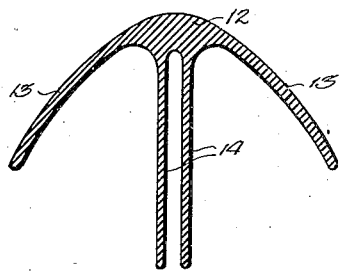
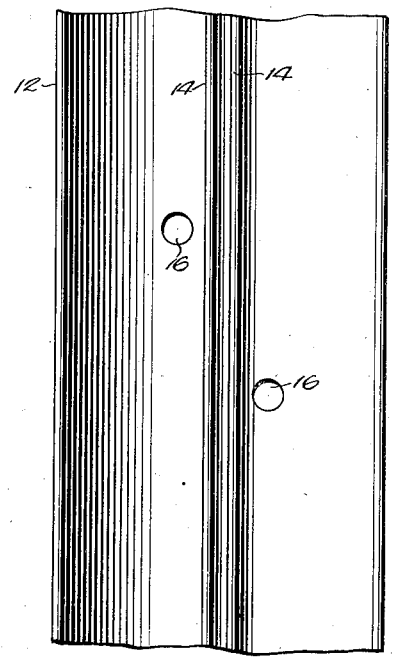
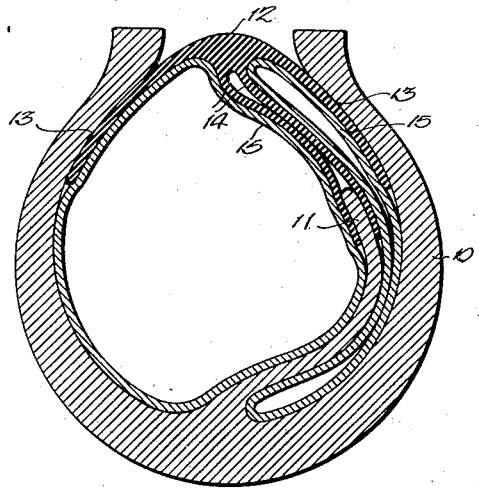

1,497,584

UNITED STATES PATENT OFFICE.

LOUIS FRANCIS PETEY, OF RHINELANDER, WISCONSIN.

PNEUMATIC TIRE.

Application filed September 19, 1923. Serial No. 663,590.

*To all whom it may concern:*

Be it known that I, LOUIS F. PETEY, a citizen of the United States of America, and a resident of Rhinelander, in the county of Oneida and State of Wisconsin, have invented a new and Improved Pneumatic Tire, of which the following is a description.

My invention relates to a pneumatic tire for vehicles and more particularly relates to a duplex tire or tire having separate compartments side by side to receive separate inner tubes so that upon the deflation and collapse of either inner tube, the other inner tube will occupy the complete space previously occupied by the two and will function sufficiently to permit of the vehicle being driven without the necessity of immediate placing of a new tube or tire.

The general object of my invention is to provide a tire of the indicated character improved in various particulars with a view to promote strength and simplicity in the form and arrangement of the members entering into the formation of the two annular inner tube compartments and to promote convenience in the assembling and disassembling of the tire.

The nature of my invention, its distinguishing features or advantages will clearly appear as the description appears.

Reference is to be had to the accompanying drawings forming a part of this specification, it being understood that the drawings are merely illustrative of one example of the invention.

Figure 1 is a cross section of a tire embodying my invention showing the tire inflated;

Figure 2 is a view similar to Figure 1 with one of the inner tubes deflated;

Figure 3 is a cross section of the annular shield or flap element employed in connection with my distinctive tire casing;

Figure 4 is an inner side view of said shield.

In carrying out my invention in accordance with the illustrated example, a casing 10, having the general exterior shape of an ordinary tire casing, is formed with an integral annular tongue or web 11 extending radially inward from the tread portion of the tire toward the inner open side thereof.

An annular shield 12 is provided to close the opening of the casing 10. Said shield is formed with side wings or flaps 13 and with annular tongues or webs 14 spaced from each other and directed radially outward. Thus, the webs 14 are disposed oppositely to the inwardly directed web 11. The respective webs 11 and 14 have such a depth radially as to overlap one another over a material area and said webs are flexible to be readily deformed laterally.

The casing 10 with its web 11 and the shield 12 with its wings 13 and web 14 when assembled, coact to form two annular compartments within the casing 10, the webs 11 and 14 going to make up a partition at the medial plane of the tire. The compartments formed by the casing 10 and shield 12 as described, accommodate two inner tubes 15 which, when inflated, maintain the medial partition radial. Said inner tubes are inflated by suitable valves, not shown, provided at openings 16 disposed in the shield 12 at opposite sides of the pair of webs 14.

It will be readily understood that should either inner tube 15 become deflated the partition formed by the webs 11 and 14 will deform itself laterally and assume a position close to one side of the casing 10 as indicated in Figure 2, the inner tube 15 at the opposite side of the partition expanding to substantially occupy the interior of the tire and under sufficient pressure to prevent flattening of the casing 10, thereby avoiding the necessity of stopping to make immediate change in the tire.

It will be observed that the web 11 of the casing 10 merges into the latter on rounded lines to avoid sharp angles and that the shield is similarly formed at the juncture of the wings 13 with the bases of the webs 14 so that the one merges into the other on rounded lines without sharp angles.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims and it is to be understood that the casing and shield may be formed of any suitable materials.

Having thus described my invention, I claim:

1. In a pneumatic tire, a casing having an interior annular web directed radially inward from the body of the casing at the tread portion and disposed approximately in the medial plane of the casing, together with a shield for the open inner side of the casing, said shield presenting annular side wings overlapping the casing at opposite sides and furthermore having spaced webs to be disposed at opposite sides of the web on the casing, the respective webs on the casing and shield overlapping over a material area thereof and being flexible to deform themselves, said casing and said shield with their respective webs forming two annular compartments in the tire side by side, the web on the casing and the webs on the shield jointly forming a partition at the medial plane of the tire, and said compartments adapted to accommodate separate inner tubes.

2. A pneumatic tire comprising a casing having at the interior thereof approximately in its medial plane an integral annular web, a separate shield closing the open inner side of the tire and having a web overlapping the web of the casing, said webs deformable laterally, said casing and said shield with their said webs jointly forming two compartments extending annularly of the tire at opposite sides of the medial plane and adapted to accommodate separate inner tubes.

3. A pneumatic tire comprising a casing having at the interior thereof approximately in its medial plane an integral annular web, a separate shield closing the open inner side of the tire and having a web overlapping the web of the casing, said webs deformable laterally, said casing and said shield with their said webs jointly forming two compartments extending annularly of the tire at opposite sides of the medial plane and adapted to accommodate separate inner tubes; together with wings on the shield at opposite sides and extending annularly of the tire, said wings overlapping adjacent portions of the casing.

4. A pneumatic tire comprising a casing, and a shield at the open inner side of said casing, said casing and said shield having overlapping members jointly forming a partition at the medial plane of the tire and deformable laterally.

5. A pneumatic tire comprising a casing, and a shield at the open inner side of said casing, said casing and said shield having overlapping flexible members jointly forming a partition within the tire at the medial plane, said members merging respectively into said casing and said shield on curved lines.

LOUIS FRANCIS PETEY.